United States Patent [19]

Horstmann

[11] 4,394,686
[45] Jul. 19, 1983

[54] METHOD AND SYSTEM FOR CORRECTING TIME BASE ERRORS IN BROADBAND SIGNALS STORED IN OR TRANSMITTED THROUGH A PLURALITY OF NARROW-BAND CHANNELS

[75] Inventor: Winfried Horstmann, Griesheim, Fed. Rep. of Germany

[73] Assignee: Robert Bosch GmbH, Stuttgart, Fed. Rep. of Germany

[21] Appl. No.: 247,774

[22] Filed: Mar. 26, 1981

[30] Foreign Application Priority Data

Mar. 28, 1980 [DE] Fed. Rep. of Germany ....... 3012070

[51] Int. Cl.$^3$ .......................... H04N 5/76; H04N 7/12
[52] U.S. Cl. ................................. 358/134; 358/320; 358/337; 360/36.1
[58] Field of Search .................. 358/8, 134, 140, 312, 358/320, 337; 370/108; 375/118; 360/36, 36.1, 36.2

[56] References Cited

U.S. PATENT DOCUMENTS

| | | | |
|---|---|---|---|
| 3,806,644 | 4/1974 | Browne et al. | 358/140 |
| 4,141,039 | 2/1979 | Yamamoto | 360/36 |
| 4,228,460 | 10/1980 | Rotter | 360/36 |
| 4,312,019 | 1/1982 | Kimura | 360/36 |

*Primary Examiner*—Joseph A. Orsino, Jr.
*Attorney, Agent, or Firm*—Frishauf, Holtz, Goodman & Woodward

[57] ABSTRACT

Time base errors arising during the playback of a broadband signal previously stored in segments in a plurality of narrow-band channels with a first time transformation are corrected. Specifically, these signals are read out in turn from the narrow channels on the tape and applied at a slow rate to a plurality of buffer storages. They are read out from the buffer storages at a relatively fast rate, in sequence, so that the broadband signal is reconstituted. The broadband signal is then demodulated. For time base correction, the horizontal synchronization signals are separated from the reconstituted demodulated signal and their timing is compared to the timing of horizontal reference signals. A pulse is formed whose pulse width is equal to the time interval between occurrence of a horizontal synchronization pulse separated from the demodulated signal and the occurrence of the corresponding reference synchronization signal. The output of the clock generator controlling the read-out from the buffer storages is delayed by a time interval equal to the pulse width. Further measures for decreasing residual errors are also specified. The measurement is carried on at the start of each line and after the signal has been reconstituted and demodulated and is thus present in a single channel.

8 Claims, 1 Drawing Figure

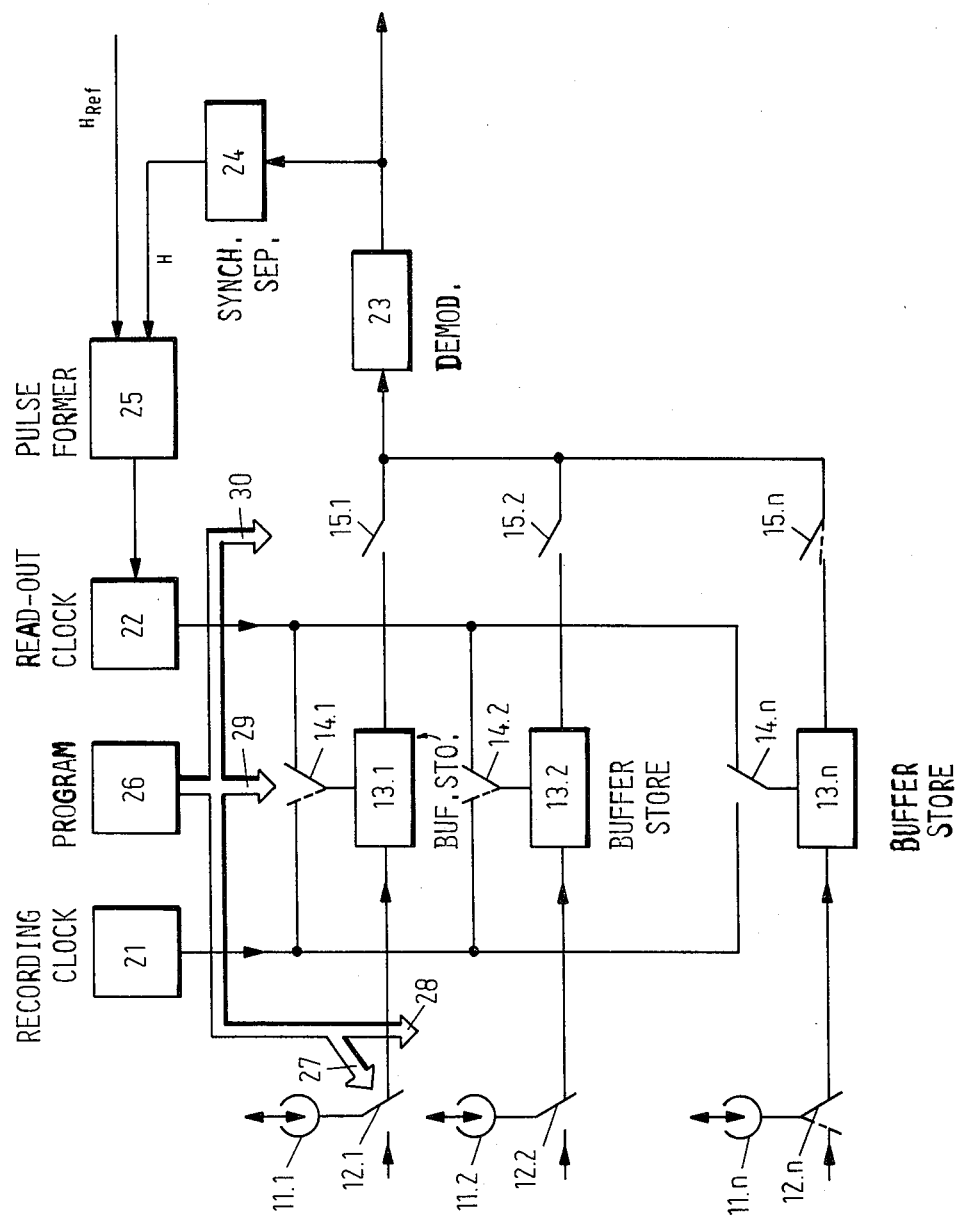

METHOD AND SYSTEM FOR CORRECTING TIME BASE ERRORS IN BROADBAND SIGNALS STORED IN OR TRANSMITTED THROUGH A PLURALITY OF NARROW-BAND CHANNELS

CROSS REFERENCE TO RELATED APPLICATIONS AND PUBLICATIONS

German published application No. P 29 08 321;
U.S. application Ser. No. 06/120,771, filed Feb. 12, 1980 in favor of Ser. No. 312,293 filed Oct. 16, 1981, based on German patent application No. P 29 08 321.

The present invention relates to a method and system for transmitting or storing broadband signals in a plurality of narrow-band channels. More specifically, the broadband signals are applied to the narrow-band channels with a first time transformation and are read out from the narrow-band channels with a second time transformation reciprocal to the first time transformation.

BACKGROUND OF THE INVENTION

A method and system is disclosed in German patent application No. P 29 08 321 in which a broadband signal is transmitted or stored in a plurality or narrow-band channels. In order to avoid having to use a plurality of modulators and demodulators in the narrow-band channels, the frequency modulation and demodulation takes place in the broadband channel. Specifically, the signals in the individual channels are stored in buffer storages, from which they read out during recording with a lower clock rate than that with which they were recorded.

During playback, the signals derived from the tape are again applied to a corresponding number of buffer storages. They are then read out from the storages, staggered with respect to time and at a higher clock rate, and are recombined to the original broadband signal. The different signal segments must of course be recombined correctly, both with respect to time and, particularly, with respect to phase. This is made more difficult by timing errors which appear during the recombination of the stored carrier frequency signals. The timing errors arise from various sources. For example, the start of the recording and playback into or from the buffer storages, which is required to effect the above-described time transformation, may not have a constant relationship to the synchronization signals of the video signal. In addition, general timing errors occur due to undesired variations in the band drive velocity, changes in the path traversed by the tape, etc.

THE INVENTION

It is an object of the present invention to furnish a system and method in which the static and dynamic timing errors which arose between recording and reproduction of above-described video signals will be corrected. It is a further object of the present invention that such a system and method allows correction during the time the signal is being reconstituted, timing errors, if any, being detected when the signal is again available in a single channel and in a demodulated state.

In accordance with the present invention, during playback, and after the signal has been reconstituted as described above, horizontal synchronization signals are separated therefrom. The time delay between occurrence of these horizontal synchronization signals and signals from a reference source is measured and a pulse is furnished whose pulse width corresponds to the above time delay. The readout from the buffer storages is then delayed by a time interval corresponding to the pulse width.

DRAWINGS ILLUSTRATING A PREFERRED EMBODIMENT

The single FIGURE is a block diagram of a playback system for broadband signals derived from a plurality of narrow channels and utilizing the time base correction system of the present invention.

DESCRIPTION OF THE PREFERRED EMBODIMENT

The playback system shown in the FIGURE has a number n of playback channels in which signal segments are stored simultaneously. The signal segments are to be read out sequentially and put together so that a continuous broadband signal results. For this purpose, the system has a number n of magnetic heads 11.1, 11.2, to 11.$n$, which read out the narrow-band signal segments stored on the magnetic tape (not shown). The pickup coils of the magnetic heads can be connected to a buffer storage 13.1, 13.2, . . . 13.$n$, by means of switches 12.1, 12.2, . . . 12.$n$. The clock input of each of the buffer storages is connected to one of selector switches 14.1, 14.2, . . . 14.$n$. One contact of each of the selector switches 14.1, 14.2, . . . 14.$n$ is connected to the output of a recording clock generator 21, while each of the other contacts is connected to the output of a readout clock generator 22. The output of each of the buffer storages 13.1, 13.2, . . . 13.$n$ is connected through a switch 15.1, 15.2, . . . 15.$n$ to the input of a demodulator demodulating the carrier frequency signal read out from the storages. A pulse separator stage 24 is connected to the output of demodulator 23. Pulse separator stage 24 separates horizontal synchronization signals from the demodulated composite video signal at the output of the demodulator. The so-separated horizontal synchronization pulses are applied to the input of a pulse-forming stage 25. The other input of pulse-forming stage 25 receives the output of a reference signal generator which generates reference horizontal synchronization signals. The output of pulse-forming stage 25 is connected to the control input of readout clock generator 22.

Switch sets 12.1, 12.2, . . . 12.$n$; 14.1, 14.2, . . . 14.$n$; and 15.1, 15.2, . . . 15.$n$ are controlled by a program control 26, as indicated by arrows 27, 28, 29 and 30.

The operation of the system is based on the use of buffer storages 13.1, 13.2, . . . 13.$n$ for time base correction during playback. The signal segments which were stored in n adjacent tracks on the magnetic tape are transferred during reproduction or playback into respective ones of the n buffer storages 13.1, 13.2, . . . 13$n$. For this purpose, the segments were recorded on the tape in individual tracks with separating gaps. Further, the starts of the segments in adjacent tracks were staggered by a predetermined amount relative to one another. Narrow-band signal segments are therefore recorded in those of buffer storages 13 in which no readout or playback is taking place.

The operation of the time transformation and time base correction of this system will be explained relative to an example: let it be assumed that buffer storages 13.1 and 13.2 are set so that information may be recorded therein, while information is to be read out from storage 13.n and then processed. Program control 26 thus sets switches 12.1 and 12.2 to the position illustrated in the FIGURE, while switch 12.n is in the position indicated by dashed lines. Switches 14.1 and 14.2 at the clock input of storages 13.1 and 13.2 are also switched to the position illustrated by dashed lines. Switch 13.n has the position shown by the solid line. Switches 15.1 and 15.2 remain open, while switch 15.n is closed by program control 26.

The clock inputs of storage 13.1 and 13.2 are thus connected to the recording clock source 21. The clock rate of clock source 21 is, on the average, smaller than the clock rate of clock 22 by a factor of 1/(n−1). The narrow-band signal segments stored on the magnetic tape are read out by heads 11.1 and 11.2 and are applied to the signal inputs of buffer storages 13.1 and 13.2 via switches 12.1 and 12.2. Buffer storages 13 may, for example, be analog shift registers. Information derived from the magnetic tape is entered into storages 13.1 and 13.2 at the relatively slow rate of clock 21. It is assumed that magnetic head 11.n is just passing over the gap between two signal segments on the tape. Therefore, its output is disconnected by switch 12.n from the signal input of buffer storage 13.n. On the other hand, the clock input of storage 13.n is connected to the playback clock generator 22 whose average clock rate is higher by a factor of n−1 than the clock rate of the recording clock generator 21. The information contained in one signal segment on the magnetic tape and stored in buffer storage 13.n is thus applied at a high speed to the input of demodulator 23 via switch 15.n.

In the next time interval, buffer storage 13.1 is assumed to be in the state from which information is read out, while the remaining buffer storages 13.2 and 13.n receive information from the magnetic tape. Switch 12.1 now separates the signal input of buffer storage 13.1 from the magnetic head, the latter just passing over a blank gap on the tape. The inputs to storages 13.1 and 13.n are connected through switches 12.2 and 12.n to magnetic heads 11.2 and 11.n to receive information therefrom. The clock input of storage 13.1 is connected through switch 14.1 to the readout clock generator 22, while the clock inputs of storages 13.2 and 13.n are connected through 14.2 and 14.n to the input of recording clock generator 21. Switch 15.1 is closed, switches 15.2 and 15.n are open. The information contained in buffer storage 13.1 is thus read out at the high rate of clock generator 22 and follows the previously read out signal segment without a gap to form a continuous signal.

In order to suppress static and dynamic time base errors, the horizontal synchronization signals present in the composite video signal of the output of demodulator 23 are separated by means of pulse separator stage 24 and are applied to pulse-forming stage 25. The pulse-forming stage 25 has a second input which receives reference horizontal synchronization signals furnished by a reference source. A pulse is formed in pulse-forming stage 25, which has a pulse width corresponding to the time interval between the receipt of the horizontal synchronization signal separated from the video information at the output of demodulator 23 until receipt of the reference horizontal synchronization signal. The pulse with this pulse width is applied to one control input of readout clock generator 22 and causes the output of this clock generator to be interrupted for a time corresponding to the time difference between the two horizontal synchronization signals. A possible residual error in the order of magnitude of ± one clock period may result. To decrease this residual error, restarting of the readout clock generator can be delayed by a time interval equal to the time between the last effective clock pulse and the start of the readout clock generator interrupt signal. The residual error is then only one clock period. This can be further decreased by allowing a selection between two or more phases of the clock. The phase to be selected is the one which coincides most closely to the respective corrected edge of the control signal, which restarts clock 22. In the simplest case, two phases of the clock signal are made available, 180° displaced from one another. It is also possible to use a start-stop oscillator for readout, the start-up phase of the oscillator coinciding with the corrected signal edge which reinitiates the operation of clock 22. After this correction, there are no residual errors resulting from the operation of the clock.

The above-described method thus jointly corrects all time base errors (variations in the time transformation during recording, static and dynamic time base errors during playback of the plurality of signal segments read out from a plurality of tracks, undesired variations during the recording and readout from the storages during the second or reciprocal transformation) by a measurement at the start of the line, when the signal is again available in one channel and in a demodulated state.

Various changes and modifications may be made within the scope of the inventive concept.

I claim:

1. In a method for reconstituting a television signal by readout at a predetermined readout rate for time transformation of individual segments of said signal stored after pickup from a record medium in a plurality of stores as received respectively from a plurality of narrow-band channels at a recording rate lower than said readout rate, said segments having been recorded on said medium after a time transformation reciprocal to said first-mentioned time transformation:
   a method for correcting time base errors in the so reconstituted television signals, comprising the steps of
   furnishing a sequence of reference television line synchronization signals;
   separating output line synchronization signals from said reconstituted television signal;
   producing for every television line a pulse lasting for substantially all the time lapse between the arrival of one of said output line synchronization signals and the next of said reference synchronization signals; and
   delaying the beginning of readout for the next television line of said individual signal segments by applying said pulse lasting for said time lapse to interrupt the furnishing of readout clock pulses for readout purposes.

2. A method for correcting time based errors as defined in claim 1 in which the readout of stored signals is clocked by a clock pulse source containing a start-stop oscillator, and in which the step of delaying the beginning of readout for the next television line is performed by applying said pulse lasting for substantially all of said time lapse to stop said oscillator until said pulse terminates.

3. A method for correcting time base errors as defined in claim 1 in which the readout of stored signals is clocked by a clock pulse source continuously producing substantially square waves at said predetermined readout rate, and in which the step of delaying the beginning of readout for the next television line is performed by interrupting at least the transitions of said continuously produced square wave signals used for triggering readout during the presence of said pulse lasting for substantially all of said time lapse.

4. A method as defined in claim 3 in which said source of continuously produced square wave signals makes available outputs that are mutually 180° out of phase, and wherein after the termination of said pulse lasting for said time lapse that output of said square wave source which provides the first wave transition of a polarity for triggering readout after said termination of said pulse is selected for clocking readout for the entire following television line.

5. In a system for reconstituting a television signal comprising multichannel means for picking up television signals from a plurality of channels of a recording medium, multichannel storage means for storing segments of television signals respectively picked up by said pickup means from an equivalent plurality of record channels, means for transferring television signal segments from said pickup channels to said storage channels at a first predetermined rate, readout means including readout clock means operating at a second predetermined rate faster than said first predetermined rate for sequentially reading out signals from said channels of said storage means and for combining them in segment sequence into a reconstituted television signal, apparatus for correcting time base errors in the so reconstituted television signals comprising:

means for furnishing a sequence of reference television line synchronization signals;
means for separating record-derived synchronizing signals from said reconstituted television signal;
means responsive to said reference television line synchronization signals and also to said record-derived line synchronization signals for producing for every television line a pulse lasting for substantially all the time lapse between the arrival of one of said record-derived synchronization signals and the next of said reference synchronization signals, and for applying the pulses so produced to interrupt the furnishing of pulses of said readout clock means to said storage means.

6. Apparatus as set forth in claim 5, in which said readout clock means contains a start-stop oscillator and in which said means for producing a pulse for every television line lasting for substantially all said time lapse and applying the same to interrupt the furnishing of readout clock pulses is constituted to apply each said pulse lasting for said time lapse to stop said start-stop oscillator until the termination of the pulse of said pulse producing and applying means.

7. Apparatus as defined in claim 5, in which said readout clock means is a source for providing a continuous sequence of pulses, and in which said means for producing for every television line a pulse lasting for substantially all said time lapse, and applying the same to interrupt the furnishing of readout clock pulses to said storage means is constituted in the form of means for interrupting the transmission of readout pulses from said readout clock means to said storage means.

8. Apparatus as set forth in claim 7, in which said readout clock means is constituted so as to provide two alternately usable sequences of substantially square pulses in opposite phase, and in which means are provided for selecting for each television line that sequence of said square pulses which is capable of producing an earlier beginning of readout after the termination of said pulse lasting for substantially all of said time lapse.

* * * * *